(12) United States Patent
Yamamoto et al.

(10) Patent No.: US 10,370,250 B2
(45) Date of Patent: Aug. 6, 2019

(54) LAYERED DOUBLE HYDROXIDE FILM AND COMPOSITE MATERIAL CONTAINING LAYERED DOUBLE HYDROXIDE

(71) Applicant: NGK INSULATORS, LTD., Nagoya-Shi (JP)

(72) Inventors: Sho Yamamoto, Nagoya (JP); Megumi Fujisaki, Nagoya (JP); Shohei Yokoyama, Nagoya (JP); Naohito Yamada, Nagoya (JP)

(73) Assignee: NGK Insulators, Ltd., Nagoya (JP)

(*) Notice: Subject to any disclaimer, the term of this patent is extended or adjusted under 35 U.S.C. 154(b) by 43 days.

(21) Appl. No.: 15/607,765

(22) Filed: May 30, 2017

(65) Prior Publication Data

US 2017/0260048 A1    Sep. 14, 2017

Related U.S. Application Data

(63) Continuation of application No. PCT/JP2015/082295, filed on Nov. 17, 2015.

(30) Foreign Application Priority Data

Dec. 17, 2014    (JP) ................. 2014-255386

(51) Int. Cl.
    *C01B 13/14*    (2006.01)
    *H01M 2/16*    (2006.01)
    (Continued)

(52) U.S. Cl.
    CPC .............. *C01B 13/14* (2013.01); *C01F 7/005* (2013.01); *C04B 35/04* (2013.01); *C04B 35/057* (2013.01);
    (Continued)

(58) Field of Classification Search
    CPC ...... C01B 13/14; H01M 2/162; H01M 2/1613; C01P 2002/22; C01P 2002/72
    See application file for complete search history.

(56) References Cited

U.S. PATENT DOCUMENTS

2014/0315099 A1    10/2014    Yamada et al.
2015/0024292 A1    1/2015    Yamada et al.

FOREIGN PATENT DOCUMENTS

CN    1333113 C    8/2007
CN    102912344 A    2/2013
(Continued)

OTHER PUBLICATIONS

Lü, Zhi, et al. "In situ growth of layered double hydroxide films on anodic aluminum oxide/aluminum and its catalytic feature in aldol condensation of acetone." Chemical Engineering Science 63.16 (2008): 4055-4062.*

(Continued)

*Primary Examiner* — Richard M Rump
(74) *Attorney, Agent, or Firm* — Burr & Brown, PLLC

(57) ABSTRACT

Provided is a layered double hydroxide membrane containing a layered double hydroxide represented by the formula: $M^{2+}_{1-x}M^{3+}_{x}(OH)_2 A^{n-}_{x/n} \cdot mH_2O$ (where $M^{2+}$ represents a divalent cation, $M^{3+}$ represents a trivalent cation, $A^{n-}$ represents an n-valent anion, n is an integer of 1 or more, and x is 0.1 to 0.4), the layered double hydroxide membrane having water impermeability. The layered double hydroxide membrane includes a dense layer having water impermeability, and a non-flat surface structure that is rich in voids and/or protrusions and disposed on at least one side of the dense layer. The present invention provides an LDH membrane suitable for use as a solid electrolyte separator for a battery, the LDH membrane including a dense layer having water impermeability, and a specific structure disposed on at (Continued)

least one side of the dense layer and suitable for reducing the interfacial resistance between the LDH membrane and an electrolytic solution.

16 Claims, 5 Drawing Sheets

(51) Int. Cl.
| | | |
|---|---|---|
| H01M 2/14 | (2006.01) | |
| C01F 7/00 | (2006.01) | |
| C04B 35/04 | (2006.01) | |
| C04B 35/057 | (2006.01) | |
| C04B 35/111 | (2006.01) | |
| C04B 35/185 | (2006.01) | |
| C04B 35/195 | (2006.01) | |
| C04B 35/26 | (2006.01) | |
| C04B 35/443 | (2006.01) | |
| C04B 35/453 | (2006.01) | |
| C04B 35/46 | (2006.01) | |
| C04B 35/486 | (2006.01) | |
| C04B 35/565 | (2006.01) | |
| H01M 8/083 | (2016.01) | |
| H01M 8/1016 | (2016.01) | |
| H01M 12/06 | (2006.01) | |
| H01M 12/08 | (2006.01) | |

(52) U.S. Cl.
CPC ......... *C04B 35/111* (2013.01); *C04B 35/185* (2013.01); *C04B 35/195* (2013.01); *C04B 35/26* (2013.01); *C04B 35/443* (2013.01); *C04B 35/453* (2013.01); *C04B 35/46* (2013.01); *C04B 35/486* (2013.01); *C04B 35/565* (2013.01); *H01M 2/145* (2013.01); *H01M 2/162* (2013.01); *H01M 2/1613* (2013.01); *H01M 2/1646* (2013.01); *H01M 2/1686* (2013.01); *C01P 2002/22* (2013.01); *C01P 2002/72* (2013.01); *C04B 2235/3225* (2013.01); *C04B 2235/6021* (2013.01); *C04B 2235/6567* (2013.01); *H01M 8/083* (2013.01); *H01M 8/1016* (2013.01); *H01M 12/06* (2013.01); *H01M 12/08* (2013.01); *H01M 2300/0014* (2013.01); *Y02E 60/128* (2013.01)

(56) References Cited

FOREIGN PATENT DOCUMENTS

| | | |
|---|---|---|
| CN | 104067437 A | 9/2014 |
| CN | 106163990 A | 11/2016 |
| EP | 2 743 377 A1 | 6/2014 |
| EP | 2 942 327 A1 | 11/2015 |
| WO | 2006/050648 A1 | 5/2006 |
| WO | 2013/161516 A1 | 10/2013 |
| WO | 2015/098610 A1 | 7/2015 |

OTHER PUBLICATIONS

Watanabe, Yujiro, et al. "Formation of Hydroxyapatite Nanocrystals on the Surface of Ca—Al-Layered Double Hydroxide." *Journal of the American Ceramic Society* 93.4 (2010): 1195-1200.*

Human translation of "Study on the Oriented Preparation and Catalysis of Layered Double Hydroxide Films" (2019).*

International Search Report and Written Opinion (with English translation), International Application No. PCT/JP2015/082295, dated Dec. 15, 2015 (19 pages).

Lü, Zhi, et al., "Microstructure-controlled synthesis of oriented layered double hydroxide thin films: Effect of varying the preparation conditions and a kinetic and mechanistic study of film formation," *Chemical Engineering Science*, vol. 62, pp. 6069-6075, dated 2007 (7 pages).

Guoxiang, Pan., et al., "Preparation of CoAl layered double hydroxide nanoflake arrays and their high supercapacitance performance," *Applied Clay Science*, vol. 102, pp. 28-32, dated 2014 (15 pages).

Gu, Yaohang., et al., "NiTi layered double hydroxide thin films for advanced pseudocapacitor electrodes," *Journal of Materials Chemistry A*, pp. 10655-10661, dated 2013 (10 pages).

Chinese Office Action (with English translation), Chinese Application No. 201580067046.8, dated Oct. 17, 2018 (12 pages).

Study on the Oriented Preparation and Catalysis of Layered Double Hydroxide Films, Xiaodong Lei, China Doctoral Dissertations Full-text Database, vol. 1, pp. 2-99, dated Oct. 15, 2006 (12 pages).

* cited by examiner

LAYERED DOUBLE HYDROXIDE FILM AND COMPOSITE MATERIAL CONTAINING LAYERED DOUBLE HYDROXIDE

CROSS-REFERENCE TO RELATED APPLICATIONS

This application is a continuation application of PCT/JP2015/082295 filed Nov. 17, 2015, which claims priority to Japanese Patent Application No. 2014-255386 filed Dec. 17, 2014, the entire contents all of which are incorporated herein by reference.

BACKGROUND OF THE INVENTION

1. Field of the Invention

The present invention relates to a layered double hydroxide membrane and a layered-double-hydroxide-containing composite material.

2. Description of the Related Art

Layered double hydroxides (hereinafter also referred to as LDHs), such as hydrotalcite, are compounds that contain exchangeable anions between hydroxide layers. To make use of their characteristics, LDHs have been used as catalysts and absorbents, as well as dispersants in polymers in order to improve heat resistance of the polymers. In particular, LDHs have recently been attracting attention as materials that exhibits hydroxide ion conductivity, and studied for use as electrolytes in alkaline fuel cells or additives in catalytic layers of zinc-air batteries.

Their traditional uses, such as catalysts, require high specific surface area, and thus it was sufficient to synthesize and use LDH powder. Meanwhile, in uses such as electrolytes in, for example, alkaline fuel cells making use of hydroxide ion conductivity, a high-density LDH membrane is desirable in order to prevent fuel gas from admixing and ensure sufficient electromotive force.

Patent Documents 1 and 2 and Non-Patent Document 1 disclose oriented LDH membranes. These oriented LDH membranes are produced by horizontally suspending the surface of a polymer substrate in a solution that contains urea and a metal salt to cause nucleation and oriented growth of LDH. The oriented LDH membranes of these Documents each show a strong peak of (003) plane in the X-ray diffraction pattern.

CITATION LIST

Patent Documents

Patent Document 1: CNC1333113
Patent Document 2: WO2006/050648

Non-Patent Document

Non-Patent Document 1: Zhi Lu, Chemical Engineering Science, 62, pp. 6069-6075 (2007), "Microstructure-controlled synthesis of oriented layered double hydroxide thin films: Effect of varying the preparation conditions and a kinetic and mechanistic study of film formation"

SUMMARY OF THE INVENTION

The present inventors have in advance successfully produced an LDH dense bulk block (hereinafter referred to as an LDH dense body). In addition, an experiment on hydroxide ion conductivity of the LDH dense body has revealed that the LDH dense body exhibits a high ion conductivity along the layers of LDH particles. Unfortunately, for the purpose of using LDH for solid electrolyte separators of alkaline secondary batteries, e.g., zinc-air batteries and nickel-zinc batteries, the LDH dense body is inadequate due to its high resistivity. For this use of LDH, it is desired to produce a thin LDH membrane that exhibits low resistivity. In consideration of the use of an LDH membrane as a solid electrolyte separator, the resistance should be reduced at the interface between the separator and an electrolytic solution.

The present inventors have found that an LDH membrane comprising a dense layer having water impermeability, the LDH membrane comprising a specific structure disposed on at least one side of the dense layer and suitable for reducing the interfacial resistance between the LDH membrane and an electrolytic solution, is suitable for use as a solid electrolyte separator for a battery.

An object of the present invention is to provide an LDH membrane suitable for use as a solid electrolyte separator for a battery, the LDH membrane comprising a dense layer having water impermeability, and a specific structure disposed on at least one side of the dense layer and suitable for reducing the interfacial resistance between the LDH membrane and an electrolytic solution.

An aspect of the present invention provides a layered double hydroxide membrane comprising a layered double hydroxide represented by the formula: $M^{2+}_{1-x}M^{3+}_{x}(OH)_2 A^{n-}_{x/n} \cdot mH_2O$ (where $M^{2+}$ represents a divalent cation, $M^{3+}$ represents a trivalent cation, $A^{n-}$ represents an n-valent anion, n is an integer of 1 or more, x is 0.1 to 0.4, and m is 0 or more), the layered double hydroxide membrane having water impermeability, wherein
  the layered double hydroxide membrane comprises a dense layer having water impermeability, and a non-flat surface structure that is rich in voids and/or protrusions and disposed on at least one side of the dense layer.

Another aspect of the present invention provides a layered-double-hydroxide-containing composite material comprising a porous substrate and the layered double hydroxide membrane according to the aforementioned aspect, the layered double hydroxide membrane being disposed on at least one surface of the porous substrate.

Still another aspect of the present invention provides a battery comprising a separator comprising the aforementioned layered double hydroxide membrane or the aforementioned layered-double-hydroxide-containing composite material.

DETAILED DESCRIPTION OF THE INVENTION

Layered Double Hydroxide Membrane

The layered double hydroxide membrane (LDH membrane) of the present invention contains a layered double hydroxide (LDH) represented by the formula: $M^{2+}_{1-x}M^{3+}_{x}(OH)_2A^{n-}_{x/n}\cdot mH_2O$ (where $M^{2+}$ represents a divalent cation, $M^{3+}$ represents a trivalent cation, $A^{n-}$ represents an n-valent anion, n is an integer of 1 or more, x is 0.1 to 0.4, and m is 0 or more). Preferably, the LDH membrane is mainly composed of the LDH. The LDH membrane has water impermeability; specifically, the LDH membrane includes a dense layer having water impermeability and a non-flat surface structure disposed on at least one side of the dense layer. The dense layer is densified enough to have water impermeability (preferably both water impermeability and gas impermeability). Thus, the LDH membrane of the present invention, which has hydroxide ion conductivity and water impermeability, can function as a separator for a battery. As described above, LDH dense bulk blocks are not suitable for solid electrolyte separators for batteries due to their high resistance. In contrast, the LDH membrane of the present invention can achieve a small thickness and a low resistance. Thus, the LDH membrane of the present invention can be very useful as a material for a solid electrolyte separator of various batteries, such as metal-air batteries (e.g., zinc-air batteries) and other zinc secondary batteries (e.g., nickel-zinc batteries).

The LDH membrane of the present invention includes a non-flat surface structure disposed on at least one side of the dense layer having water impermeability. This non-flat surface structure is rich in voids and/or protrusions and thus achieves a very large surface area in contrast to the dense layer. Thus, the use of the LDH membrane as a separator in an electrolytic solution leads to an increase in interfacial area between the LDH membrane and the electrolytic solution, resulting in reduced interfacial resistance. The dense layered structure having such a surface structure and exhibiting hydroxide ion conductivity and water impermeability can function as an LDH separator exhibiting a low interfacial resistance with an electrolytic solution.

Figure 5A:
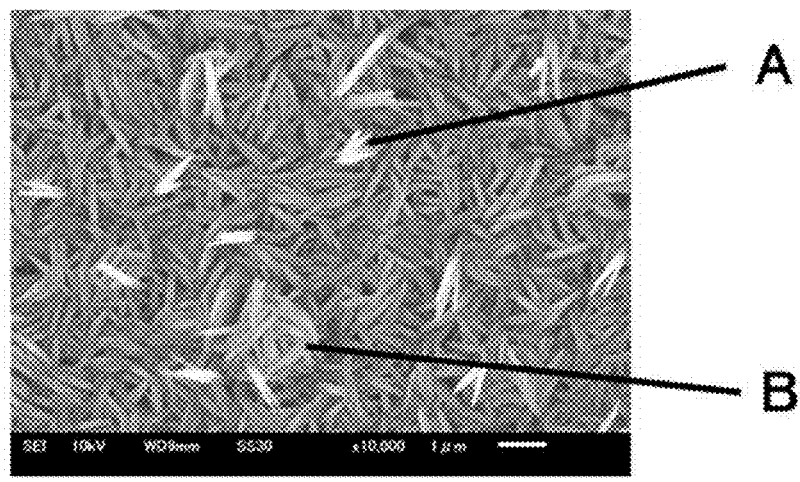
FIG. 5A is a SEM image of a surface microstructure of a LDH membrane sample in Example 2.
Figure 5B:
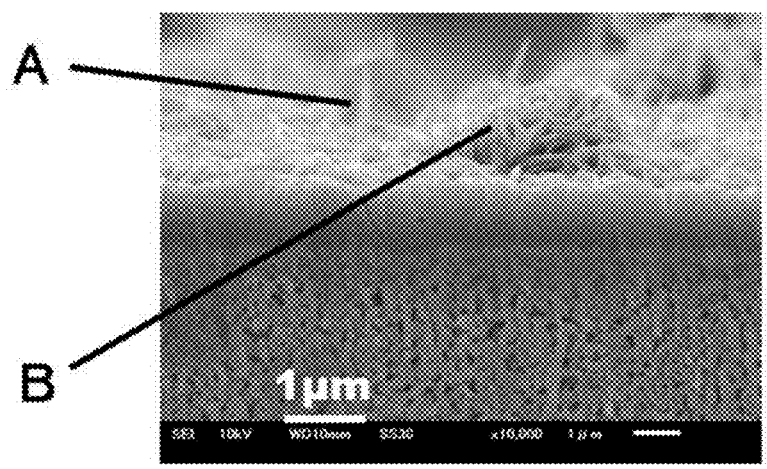
FIG. 5B is a SEM image of a microstructure at a cross-sectional surface of a LDH membrane sample in Example 2.

The non-flat surface structure preferably contains acicular particles protruding from the dense layer in a direction away from the dense layer (typically substantially perpendicular to the dense layer). FIGS. 5A and 5B are SEM images of an exemplary LDH membrane wherein reference symbol A represents acicular particles. The presence of the acicular particles can significantly increase the surface area of the LDH membrane, resulting in an effective and significant reduction in interfacial resistance between the LDH membrane and an electrolytic solution. The cross-sectional diameter of each acicular particle is preferably 0.01 to 0.5 µm, more preferably 0.01 to 0.3 µm. The height of each acicular particle is preferably 0.5 to 3.0 µm, more preferably 1 to 3 µm. As used herein, "the height of each acicular particle" refers to the height of a protruding portion of the particle as measured from the surface of the dense layer.

The non-flat surface structure also preferably contains open-porous coarse particles that are rich in voids. The presence of the open-porous coarse particles can significantly increase the surface area of the LDH membrane, resulting in an effective reduction in interfacial resistance between the LDH membrane and an electrolytic solution. In a particularly preferred embodiment, the open-porous coarse particles are composed of agglomerates of acicular or platy particles entangling each other to form voids. The agglomerates, which may be called spherical moss-like particles, exhibit the effect of increasing the surface area of the LDH membrane. FIGS. 5A and 5B are SEM images of an exemplary LDH membrane wherein reference symbol B denotes spherical moss-like particles. The open-porous coarse particles each have a diameter of preferably 0.5 to 30 more preferably 0.5 to 20 µm, as measured in a direction parallel to the dense layer. The height of each porous coarse particle is preferably 0.5 to 30 µm, more preferably 1 to 30 µm. As used herein, "the height of each open-porous coarse particle" refers to the height of a protruding portion of the particle as measured from the surface of the dense layer. The non-flat surface structure also preferably contains both acicular particles and open-porous coarse particles.

The LDH membrane comprises a layered double hydroxide (LDH) represented by the general formula $M^{2+}_{1-x}M^{3+}_{x}(OH)_2A^{n-}_{x/n}\cdot mH_2O$ (where $M^{2+}$ represents a divalent cation, $M^{3+}$ represents a trivalent cation, $A^{n-}$ represents an n-valent anion, n represents an integer not less than 1, x represents a value of 0.1 to 0.4, and m represents a value not less than 0). In addition, the LDH membrane exhibits water impermeability. In the general formula, $M^{2+}$ may represent any divalent cation; preferably, $M^{2+}$ represents, for example, $Mg^{2+}$, $Ca^{2+}$ and/or $Zn^{2+}$, and more preferably $Mg^{2+}$. $M^{3+}$ may represent any trivalent cation; preferably, $M^{3+}$ represents, for example, $Al^{3+}$ and/or $Cr^{3+}$, and more preferably $Al^{3+}$. $A^{n-}$ may represent any anion, and preferably, for example, $OH^-$ and/or $CO_3^{2-}$. Hence, it is preferable that, in the general formula, $M^{2+}$ comprises $Mg^{2+}$, $M^{3+}$ comprises $Al^{3+}$, and $A^{n-}$ comprises $OH^-$ and/or $CO_3^{2-}$. In the general formula, n represents an integer not less than 1, and preferably 1 or 2; x represents a value of 0.1 to 0.4, and preferably 0.2 to 0.35; and m represents a value not less than 0, and more preferably a real number or an integer more than 0 or not less than 1.

The LDH membrane exhibits water impermeability (desirably water impermeability and gas impermeability). For example, the LDH membrane does not let water pass through the surface for a week during which this surface is in contact with the water at 25° C. In other words, it is preferred that the LDH membrane is composed of high density LDH and exhibits water impermeability. If local and/or incidental defects that exhibit water permeability are present in or on the LDH membrane, such defects may be filled with an adequate repairing material (e.g., an epoxy resin) to achieve water impermeability. Such a repairing material does not necessarily exhibit hydroxide ion conductivity.

The layered double hydroxide contained in the dense layer of the LDH membrane is composed of an agglomeration of platy particles (i.e., platy LDH particles). Preferably, these platy particles are oriented in such a manner that the tabular faces of the platy particles are substantially perpendicular to or oblique to the surface of the porous substrate (i.e., the substrate surface). It is known that the LDH crystal has a form of a platy particle with a layered structure as shown in FIG. 3. The substantially perpendicular or oblique orientation described above is significantly beneficial for the LDH membrane, because an oriented LDH membrane exhibits anisotropic hydroxide ion conductivity, i.e., hydroxide ion conductivity along the orientation of the platy LDH particles (i.e., parallel to layers of LDH) is much greater than hydroxide ion conductivity perpendicular to the orientation of the platy LDH particles in the oriented LDH membrane. In fact, the present inventors have revealed that, the hydroxide ion conductivity (S/cm) along the orientation of LDH particles in an oriented LDH bulk body is an order of magnitude greater than the hydroxide ion conductivity (S/cm) perpendicular to the orientation of LDH particles. Thus, the substantially perpendicular or oblique orientation in the LDH membrane of the present invention fully or significantly educes the anisotropic hydroxide ion conductivity of the oriented LDH to the thickness direction of the layer (i.e., the direction perpendicular to the surface of the functional layer or the surface of the porous substrate), whereby the conductivity along the thickness direction can be maximally or significantly increased. In addition, the LDH membrane of the present invention exhibits lower resistivity than an LDH bulk block by virtue of its layered shape. The LDH membrane with such an orientation readily conducts hydroxide ions along the thickness direction of the layer. Since the LDH membrane has high density, it is significantly appropriate for use in a functional layer that requires high conductivity across the thickness of the layer and high density, such as a separator of a battery (e.g., a hydroxide ion conductive separator of a zinc-air battery).

In a particularly preferred embodiment, the LDH membrane should be composed of the platy LDH particles highly oriented in the substantially perpendicular direction. If the platy LDH particles are highly orientated in the substantially perpendicular direction, X-ray diffractometry of the surface of the functional layer shows no peak of (003) plane or a peak of (003) plane smaller than that of (012) plane (note that this shall not apply to the case where the porous substrate shows a peak at the same angle as a peak of (012) plane of the platy LDH particles, because a peak of (012) plane of the platy LDH particles cannot be distinguished). This characteristic peak profile indicates that the platy LDH particles of the functional layer are oriented substantially perpendicular to (i.e, perpendicular to or nearly perpendicular to, and preferably perpendicular to) the functional layer. The peak of (003) plane is strongest among peaks observed in X-ray diffractometry of non-oriented LDH powder. In contrast, the oriented LDH membrane shows no peak of (003) plane or a peak of (003) plane smaller than a peak of (012) plane because platy LDH particles are oriented substantially perpendicular to the functional layer. This can be explained as follows: The c planes (001) including the (003) plane (note that I is 3 or 6) are parallel to the layers of platy LDH particles. If the platy LDH particles are oriented substantially perpendicular to the functional layer, the layers of platy LDH particles are also perpendicular to the functional layer and thus the X-ray diffractometry of the surface of the functional layer shows no peak or hardly shows a peak of (001) plane. The peak of (003) plane is often stronger, if present, than the peak of (006) plane, and use of the peak of (003) plane can more readily confirm the substantially perpendicular orientation than use of the peak of (006) plane. Hence, the oriented LDH membrane preferably shows no or substantially no peak of (003) plane or shows a peak of (003) plane smaller than a peak of (012) plane, which indicates that the highly perpendicular orientation is achieved. In contrast, oriented LDH membranes of Patent Documents 1 and 2 and Non-Patent Document 1 each show a strong peak of (003) plane, which indicates that the substantially perpendicular orientation is not satisfactorily achieved. In addition, the membranes of these Documents do not seem to be dense.

The thickness of the LDH membrane is preferably not more than 100 µm, more preferably not more than 75 µm, still more preferably not more than 50 µm, further more preferably not more than 25 µm, and most preferably not more than 5 µm. The thickness of the LDH membrane having the above thinness exhibits low resistivity desirable for use in, for example, a battery. The thickness of the LDH membrane does not have a lower limit, which depends on its use. In order to ensure hardness desirable for use in a functional layer, such as a separator, the thickness is preferably not less than 1 µm, and more preferably not less than 2 µm.

The LDH membrane is typically a dense layer, and is preferred to be densified to exhibit water impermeability (desirably water impermeability and gas impermeability). Throughout the specification, the term "water impermeability" indicates that water in contact with one side of an object (i.e., the functional layer and/or the porous substrate) does not pass through to the other or opposite side during the "density evaluation test I" performed in Examples described later or any other equivalent method or system. The LDH-containing composite material of the present invention has a unique function; i.e., the composite material has hydroxide ion conductivity and water impermeability, if the functional layer is densified enough with the LDH to exhibit water impermeability.

Layered-Double-Hydroxide-Containing Composite Material

The LDH membrane is preferably disposed on at least one surface of a porous substrate. In a preferred embodiment, the present invention provides a layered-double-hydroxide-containing composite material comprising a porous substrate and the layered double hydroxide membrane disposed on at least one surface of the porous substrate. As used herein, "the surface of a porous substrate" generally refers to the outermost surface of the porous substrate, which has a platy shape under macroscopic observation of the substrate, and may also refer to the surfaces of pores present near the outermost surface of the platy porous substrate under microscopic observation of the substrate.

The porous substrate is preferably one on which the LDH membrane can be formed. The porous substrate may be composed of any material and may have any porous structure. In a typical embodiment, the LDH membrane is formed on the surface of the porous substrate. Alternatively, the LDH membrane may be formed on a non-porous substrate, and then the non-porous substrate may be modified into a porous form by any known process. The porous substrate preferably has a water-permeable porous structure because such a porous structure enables an electrolytic solution to come into contact with the LDH membrane in the case of the use of the composite material as a separator for a battery.

The porous substrate is preferably composed of at least one selected from the group consisting of ceramic materials, metal materials, and polymer materials. The porous substrate is more preferably composed of a ceramic material. Preferred examples of the ceramic material include alumina, zirconia, titania, magnesia, spinel, calcia, cordierite, zeolite, mullite, ferrite, zinc oxide, silicon carbide, and any combination thereof. More preferred are alumina, zirconia, titania, and any combination thereof. Particularly preferred are alumina and zirconia (e.g., yttria-stabilized zirconia (YSZ)). The use of such a porous ceramic material facilitates the formation of a highly-densified LDH membrane. Preferred examples of the metal material include aluminum and zinc. Preferred examples of the polymer material include polystyrene, polyether sulfone, polypropylene, epoxy resins, polyphenylene sulfide, hydrophilized fluororesins (e.g., poly (tetrafluoroethylene) (PTFE)), and any combination thereof. The above-mentioned preferred materials all have alkali resistance (i.e., resistance to an electrolytic solution of a battery).

The porous substrate has an average pore size of preferably 0.001 to 1.5 µm, more preferably 0.001 to 1.25 still more preferably 0.001 to 1.0 µm, particularly preferably 0.001 to 0.75 most preferably 0.001 to 0.5 µm. These ranges make it possible to form a dense LDH membrane exhibiting water impermeability (desirably water impermeability and gas impermeability) while ensuring desired water permeability in the porous substrate. Throughout the specification, the term "water impermeability" indicates that water in contact with one side of an object (i.e., the LDH membrane and/or the porous substrate) does not pass through to the other or opposite side during the "density evaluation test I" performed in Examples described later or any other equivalent method or system. In the present invention, the average pore size can be determined by measuring the largest length of each pore in an electron microscopic image of the surface of the porous substrate. The magnification of the electron microscopic image used in this measurement is 20,000 or more. All the measured pore sizes are listed in order of size to calculate the average, from which the subsequent 15 larger sizes and the subsequent 15 smaller sizes, i.e., 30 diameters in total, are selected in one field of view. The selected sizes of two fields of view are then averaged to yield the average pore size. The pore sizes can be measured by, for example, a length-measuring function of a SEM or image analysis software (e.g., Photoshop manufactured by Adobe).

The surface of the porous substrate has a porosity of preferably 10 to 60%, more preferably 15 to 55%, still more preferably 20 to 50%. These ranges make it possible to form a dense LDH membrane that exhibits water impermeability (desirably water impermeability and gas impermeability), while ensuring desired water permeability of the porous substrate. The surface porosity of the porous substrate is used in the present invention because it can be readily measured by image processing described below and substantially reflects the internal porosity of the porous substrate. Thus, if the surface of the porous substrate is dense, the inside of the porous substrate is also dense. In the present invention, the porosity at the surface of the porous substrate can be measured by a method involving image processing as follows: 1) an electron microscopic (SEM) image of the surface of the porous substrate is taken at a magnification of 10,000 or more; 2) the grayscale SEM image is read with an image analysis software, such as Photoshop (manufactured by Adobe); 3) a monochromatic binary image is prepared by using tools named [image], [color compensation], and [binarization] in this order; and 4) the porosity (%) is calculated by dividing the number of pixels of the black area(s) by the number of all the pixels of the image. Preferably, the porosity is measured over a 6 µm×6 µm area of the surface of the porous substrate by image processing. More preferably, the porosities in three 6 µm×6 µm areas selected at random are averaged for objective evaluation.

Production Method

The LDH membrane and LDH-containing composite material is preferably produced through a method involving (a) providing a porous substrate, (b) evenly depositing a material for generating a species from which LDH crystal growth starts (i.e., a material for starting crystal growth) on the porous substrate if needed, and (c) hydrothermally treating the porous substrate to form an LDH membrane.

(a) Provision of Porous Substrate

As described above, the porous substrate is preferably composed of at least one selected from the group consisting of ceramic materials, metal materials, and polymer materials. The porous substrate is more preferably composed of a ceramic material. Preferred examples of the ceramic material include alumina, zirconia, titania, magnesia, spinel, calcia, cordierite, zeolite, mullite, ferrite, zinc oxide, silicon carbide, and any combination thereof. More preferred are alumina, zirconia, titania, and any combination thereof. Particularly preferred are alumina, zirconia (e.g., yttria-stabilized zirconia (YSZ)), and any combination thereof. The use of such a porous ceramic material tends to improve the density of a LDH membrane. In the case of a ceramic porous substrate, the porous substrate is preferably subjected to, for example, ultrasonic cleaning or cleaning with ion-exchange water.

As described above, the porous substrate is more preferably composed of a ceramic material. The ceramic porous substrate may be a commercially available one or may be prepared by any known process. For example, the ceramic porous substrate may be prepared as follows: Ceramic powder (e.g., zirconia powder, boehmite powder, or titania powder), methyl cellulose, and ion-exchange water are mixed in predetermined proportions; the resultant mixture is subjected to extrusion molding; the molded product is dried at 70 to 200° C. for 10 to 40 hours; and the dried product is fired at 900 to 1,300° C. for one to five hours. The amount of methyl cellulose is preferably 1 to 20 parts by weight relative to 100 parts by weight of the ceramic powder. The amount of ion-exchange water is preferably 10 to 100 parts by weight relative to 100 parts by weight of the ceramic powder.

(b) Deposition of Material for Starting Crystal Growth

If needed, a material for generating a species from which LDH crystal growth starts may be evenly deposited on the porous substrate. The even deposition of such a material on the surface of the porous substrate and the subsequent step (c) can form a highly-densified LDH membrane evenly on the porous substrate. Preferred examples of the species from which LDH crystal growth starts include chemical species generating an anion that can enter between layers of LDH, chemical species generating a cation that can constitute LDH, and LDHs.

(i) Anion-Generating Chemical Species

The LDH crystal growth may start from a chemical species generating an anion that can enter between LDH layers. Examples of the anion include $CO_3^{2-}$, $OH^-$, $SO_3^-$, $SO_3^{2-}$, $SO_4^{2-}$, $NO_3^-$, $Cl^-$, $Br^-$, and any combination thereof. A material for generating such a species may be evenly deposited on the surface of the porous substrate by a process suitable for the material. The deposition of such an anion-generating chemical species on the surface of the porous substrate leads to adsorption of a metal cation (e.g., $Mg^{2+}$ or $Al^{3+}$) on the surface of the porous substrate, resulting in nucleation of LDH. Thus, the subsequent step (c) can evenly form a highly-densified LDH membrane on the surface of the porous substrate.

In a preferred embodiment of the present invention, the material for starting crystal growth may be deposited on the porous substrate after the deposition of a polymer on the surface of the porous substrate and subsequent introduction of an anion-generating chemical species into the polymer. In this embodiment, the anion is preferably $SO_3^-$, $SO_3^{2-}$, and/or $SO_4^{2-}$. Such an anion-generating chemical species is preferably introduced into the polymer through sulfonation. The polymer may be an anionizable (in particular, sulfonatable) polymer. Examples of such a polymer include polystyrene, polyether sulfone, polypropylene, epoxy resins, polyphenylene sulfide, and any combination thereof. Aromatic polymers are particularly preferred because they are readily anionized (in particular, sulfonated). Examples of the aromatic polymers include polystyrene, polyether sulfone, epoxy resins, polyphenylene sulfide, and any combination thereof. Most preferred is polystyrene. The deposition of the polymer on the porous substrate preferably involves application of a polymer solution to the surface of the porous substrate (preferably, to particles forming the outermost surface of the platy porous substrate). The polymer solution can be readily prepared by, for example, dissolution of a solid polymer (e.g., a polystyrene substrate) in an organic solvent (e.g., xylene). In view of even application of the polymer solution, the solution is preferably applied to the porous substrate such that the solution does not permeate the substrate. Thus, spin coating is preferred for very even deposition or application of the polymer solution. The spin coating may be performed under any conditions; for example, a rotation speed of 1,000 to 10,000 rpm and an operational period of about 60 to 300 seconds (involving dropwise addition and drying). The sulfonation may be performed by immersing the polymer-deposited porous substrate in an acid for sulfonating the polymer, such as sulfuric acid (e.g., concentrated sulfuric acid), fuming sulfuric acid, chlorosulfonic acid, and sulfuric anhydride. Any other sulfonation techniques may also be used. The porous substrate may be immersed in such a sulfonating acid at room temperature or a high temperature (e.g., 50 to 150° C.) for any period of time (e.g., 1 to 14 days).

In another preferred embodiment of the present invention, the material for starting crystal growth may be deposited on the porous substrate by treatment of the surface of the substrate with a surfactant containing an anion-generating chemical species as a hydrophilic moiety. In this embodiment, the anion is preferably $SO_3^-$, $SO_3^{2-}$, and/or $SO_4^{2-}$. Typical examples of such a surfactant include anionic surfactants. Preferred examples of the anionic surfactant include sulfonate anionic surfactants, sulfate anionic surfactants, and any combination thereof. Examples of the sulfonate anionic surfactants include (sodium naphthalenesulfonate)-formalin condensate, disodium polyoxyethylene alkyl sulfosuccinate, poly(sodium styrenesulfonate), sodium dioctyl sulfosuccinate, and polyoxyethylene lauryl ether sulfate triethanolamine. Examples of the sulfate anionic surfactants include sodium polyoxyethylene lauryl ether sulfate. The porous substrate may be treated with a surfactant by any process that can deposit the surfactant on the surface of the substrate; for example, application of a surfactant-containing solution to the porous substrate, or immersion of the porous substrate in a surfactant-containing solution. The porous substrate may be immersed in the surfactant-containing solution with agitation of the solution at room temperature or a high temperature (e.g., 40 to 80° C.) for any period of time (e.g., one to seven days).

(ii) Cation-Generating Chemical Species

The LDH crystal growth may start from a chemical species generating a cation that can constitute the layered double hydroxide. Such a cation is preferably $Al^{3+}$, for example. In this case, the material for starting crystal growth is preferably at least one aluminum compound selected from the group consisting of oxides, hydroxides, oxyhydroxides, and hydroxy complexes of aluminum. A material for generating such a chemical species may be evenly deposited on the surface of the porous substrate by a process suitable for the material. The deposition of such a cation-generating chemical species on the surface of the porous substrate leads to adsorption of an anion that can enter between layers of LDH on the surface of the porous substrate, resulting in nucleation of LDH. Thus, the subsequent step (c) can evenly form a highly-densified LDH membrane on the surface of the porous substrate.

In a preferred embodiment of the present invention, the material for starting crystal growth may be deposited on the porous substrate by application of a sol containing an aluminum compound to the porous substrate. Preferred examples of the aluminum compound include boehmite (AlOOH), aluminum hydroxide ($Al(OH)_3$), and amorphous alumina. Most preferred is boehmite. Spin coating is preferably used for very even application of the sol containing the aluminum compound. The spin coating may be performed under any conditions; for example, a rotation speed of 1,000 to 10,000 rpm and an operational period of about 60 to 300 seconds (involving dropwise addition and drying).

In another preferred embodiment of the present invention, the material for starting crystal growth may be deposited on the porous substrate by hydrothermal treatment of the porous substrate in an aqueous solution containing at least aluminum to form an aluminum compound on the surface of the porous substrate. The aluminum compound to be formed on the surface of the porous substrate is preferably $Al(OH)_3$. The LDH membrane on the porous substrate (in particular, a ceramic porous substrate) tends to form crystalline and/or amorphous $Al(OH)_3$ at the initial growth stage. LDH growth may start from the $Al(OH)_3$ serving as a nucleus. Thus, the hydrothermal treatment step (c) after even deposition of $Al(OH)_3$ on the surface of the porous substrate by hydrothermal treatment can evenly form a highly-densified LDH membrane on the surface of the porous substrate. In this embodiment, steps (b) and (c) may be continuously performed in the same hermetic container, or may be sequentially performed in separate containers.

If steps (b) and (c) are continuously performed in the same hermetic container, an aqueous stock solution used in step (c) (i.e., an aqueous solution containing an element constituting LDH) may be used in step (b). In such a case, the hydrothermal treatment in step (b) is performed in a hermetic container (preferably an autoclave) in an acidic or neutral pH range (preferably at a pH of 5.5 to 7.0) at a relatively low temperature of 50 to 70° C., to promote nucleation of $Al(OH)_3$, instead of LDH. After the nucleation of $Al(OH)_3$, the aqueous stock solution is maintained at the nucleation temperature or heated from the temperature, to promote hydrolysis of urea, resulting in an increase in pH of the aqueous stock solution. Thus, step (b) is smoothly followed by step (c) in a pH range suitable for LDH growth (preferably a pH of more than 7.0).

If steps (b) and (c) are sequentially performed in separate containers, it is preferred that different aqueous stock solutions be used for steps (b) and (c). For example, step (b) preferably involves the use of an aqueous stock solution primarily containing an Al source (preferably, not containing a metal other than Al) for nucleation of $Al(OH)_3$. In this case, the hydrothermal treatment in step (b) may be performed at 50 to 120° C. in a hermetic container (preferably an autoclave) different from that used in step (c). Preferred examples of the aqueous stock solution primarily containing an Al source include an aqueous solution containing aluminum nitrate and urea but not containing a magnesium compound (e.g., magnesium nitrate). The use of the Mg-free aqueous stock solution can avoid precipitation of LDH, resulting in promotion of nucleation of Al(OH)$_3$.

In another preferred embodiment of the present invention, the material for starting crystal growth may be deposited on the porous substrate by vapor deposition of aluminum on the surface of the porous substrate and then conversion of the aluminum into an aluminum compound through hydrothermal treatment in an aqueous solution. The aluminum compound is preferably Al(OH)$_3$. In particular, the conversion of aluminum into Al(OH)$_3$ promotes LDH growth from the Al(OH)$_3$ serving as a nucleus. Thus, step (c) of hydrothermal treatment after even formation of Al(OH)$_3$ on the surface of the porous substrate by hydrothermal treatment can evenly form a highly-densified LDH membrane on the surface of the porous substrate. The vapor deposition of aluminum may involve physical or chemical vapor deposition, and preferably involves physical vapor deposition, such as vacuum deposition. The hydrothermal treatment for conversion of aluminum into Al(OH)$_3$ may use any aqueous solution containing a component that can react with the deposited Al to form Al(OH)$_3$.

(iii) LDH as Material for Starting Crystal Growth

The crystal growth may start from LDH. In this case, LDH growth may start form LDH serving as a nucleus. The even deposition of the LDH nucleus on the surface of the porous substrate and subsequent step (c) can form a highly-densified LDH membrane evenly on the porous substrate.

In a preferred embodiment of the present invention, the material for starting crystal growth may be deposited on the porous substrate by application of an LDH-containing sol to the surface of the porous substrate. The LDH-containing sol may be prepared by dispersion of LDH in a solvent, such as water. In this embodiment, spin coating is preferably used for very even application of the LDH-containing sol. The spin coating may be performed under any conditions; for example, a rotation speed of 1,000 to 10,000 rpm and an operational period of about 60 to 300 seconds (involving dropwise addition and drying).

In another preferred embodiment of the present invention, the material for starting crystal growth may be deposited on the porous substrate by vapor deposition of aluminum on the surface of the porous substrate and then conversion of the (vapor-deposited) aluminum into LDH through hydrothermal treatment in an aqueous solution containing an element constituting LDH other than aluminum. The vapor deposition of aluminum may involve physical or chemical vapor deposition, and preferably involves physical vapor deposition, such as vacuum deposition. The hydrothermal treatment for conversion of aluminum into LDH may use an aqueous stock solution containing a component other than the vapor-deposited Al. Preferred examples of the aqueous stock solution include an aqueous stock solution primarily containing an Mg source. More preferred is an aqueous solution containing magnesium nitrate and urea but not containing an aluminum compound (e.g., aluminum nitrate). The use of the Mg source-containing aqueous solution results in nucleation of LDH together with the vapor-deposited Al.

(c) Hydrothermal Treatment

The porous substrate (on which the material for starting crystal growth may be deposited if needed) is hydrothermally treated in an aqueous stock solution containing the elements of LDH, to form the LDH membrane on the surface of the porous substrate. Preferably, the aqueous stock solution contains magnesium ions (Mg$^{2+}$) and aluminum ions (Al$^{3+}$) in a specific total concentration and further contains urea. Urea is hydrolyzed into ammonia and raises the pH of the aqueous stock solution (e.g., a pH of more than 7.0, preferably a pH of more than 7.0 and 8.5 or less), and metal ions co-existing in the aqueous stock solution form hydroxides, to produce LDH. The hydrolysis of urea, which also generates carbon dioxide, can form LDH having carbonate ions as anions. The aqueous stock solution contains magnesium ions (Mg$^{2+}$) and aluminum ions (Al$^{3+}$) in a total concentration of preferably 0.20 to 0.40 mol/L, more preferably 0.22 to 0.38 mol/L, still more preferably 0.24 to 0.36 mol/L, particularly preferably 0.26 to 0.34 mol/L. Such a preferred concentration range facilitates the nucleation and the crystal growth in a well-balanced manner and can form a highly-oriented, high-density LDH membrane. At a low total concentration of magnesium ions and aluminum ions, the crystal growth dominates over the nucleation, resulting in a decrease in number of LDH particles and an increase in size of the LDH particles. At a high total concentration, the nucleation dominates over the crystal growth, resulting in an increase in number of LDH particles and a decrease in size of the LDH particles.

Preferably, the aqueous stock solution contains dissolved magnesium nitrate and aluminum nitrate; i.e., the aqueous stock solution contains nitrate ions besides magnesium ions and aluminum ions. In this case, the molar ratio of the urea to the nitrate ions (NO$_3^-$) (i.e., urea/NO$_3^-$) in the aqueous stock solution is preferably 2 to 6, more preferably 4 to 5.

The porous substrate may be immersed in the aqueous stock solution in a desired direction (e.g., horizontally or perpendicularly). For horizontal retention of the porous substrate, the porous substrate may be hanged up in or suspended in a container of the aqueous stock solution, or placed on the bottom of the container. For example, the porous substrate may be immobilized and suspended in the stock solution and away from the bottom of the container. For perpendicular retention of the porous substrate, a jig may be disposed that can hold the porous substrate perpendicularly to the bottom of the container. In any case, a preferred configuration or arrangement is one that can achieve growth of LDH substantially perpendicular to the porous substrate (i.e., growth of LDH such that the tabular faces of platy LDH particles are substantially perpendicular to or oblique to the surface of the porous substrate).

The porous substrate is hydrothermally treated in the aqueous stock solution to form the LDH membrane on the surface of the porous substrate. The hydrothermal treatment is performed in a hermetic container (preferably an autoclave) at a temperature of preferably 60 to 150° C., more preferably 65 to 120° C., still more preferably 65 to 100° C., particularly preferably 70 to 90° C. The hydrothermal treatment temperature may have any upper limit without causing thermal deformation of the porous substrate (e.g., a polymer substrate). The temperature can be elevated at any rate in the hydrothermal treatment. The temperature elevation rate may be 10 to 200° C./h, and preferably 100 to 200° C./h, more preferably 100 to 150° C./h. The time for the hydrothermal treatment may be determined depending on the target density or thickness of the LDH membrane.

After the hydrothermal treatment, the porous substrate is removed from the hermetic container, and then preferably cleaned with ion-exchange water.

The LDH membrane produced as described above is composed of densely assembled platy LDH particles that are oriented in the substantially perpendicular direction, which is beneficial for the conductivity. The LDH membrane typically exhibits water impermeability (preferably both water impermeability and gas impermeability) because of its high density. The LDH membrane is typically composed of an agglomeration of platy particles, and these platy particles are oriented such that the tabular faces of the platy particles are substantially perpendicular to or oblique to the surface of the porous substrate. Thus, the use of the dense LDH membrane having sufficient gas-tight properties in batteries (e.g., zinc-air batteries) will lead to an improvement in electricity generating capacity. Furthermore, the dense LDH membrane is expected to be used in novel applications, such as a separator that can prevent growth of dendritic zinc and permeation of carbon dioxide, which have been large technical barriers against forming a zinc-air secondary battery containing an electrolytic solution that has not been achieved. The dense LDH membrane can also be used in a separator for a nickel-zinc battery that has suffered from growth of dendritic zinc which is an obstacle to practical use of this battery.

The above-described method may form LDH membranes on the two surfaces of the porous substrate. Thus, in order to modify the LDH-containing composite material into a form suitable for use as a separator, the LDH membrane on one surface of the porous substrate is preferably removed through mechanical polishing after the formation of the LDH membranes. Alternatively, it is desirable to take a measure to prevent formation of the LDH membrane on one surface of the porous substrate.

EXAMPLES

The present invention will be described in more detail by way of Examples below.

Oriented layered double hydroxide membranes were formed on porous substrates in Examples described below. The membrane samples prepared in the Examples were evaluated as follows.

Evaluation 1: Identification of Membrane Sample

A crystalline phase of a membrane sample is analyzed with an X-ray diffractometer (RINT-TTR III, manufactured by Rigaku Corporation) at a voltage of 50 kV, a current of 300 mA, and a measuring range of 10° to 70°. The resultant XRD profile is compared with the diffraction peaks of a layered double hydroxide (or a hydrotalcite compound) described in JCPDS card No. 35-0964 for identification of the membrane sample.

Evaluation 2: Observation of Microstructure

The surface microstructure of the membrane sample was observed with a scanning electron microscope (SEM; JSM-6610LV, manufactured by JEOL Ltd.) at an acceleration voltage of 10 to 20 kV.

A cross section of the membrane sample was polished with an ion milling apparatus (IM4000, manufactured by Hitachi High-Technologies Corporation), and the microstructure of the polished cross section was observed with an SEM under the same conditions as those for the observation of the surface microstructure.

Evaluation 3: Density Evaluation Test I

Figure 1:
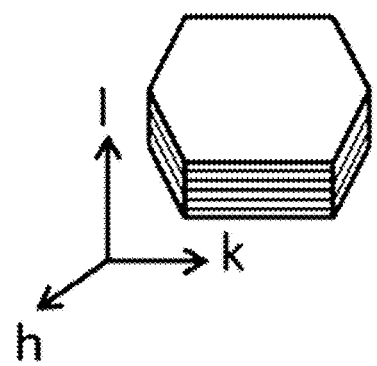
FIG. 1 is a schematic illustration of a platy particle of layered double hydroxide (LDH).
Figure 2A:
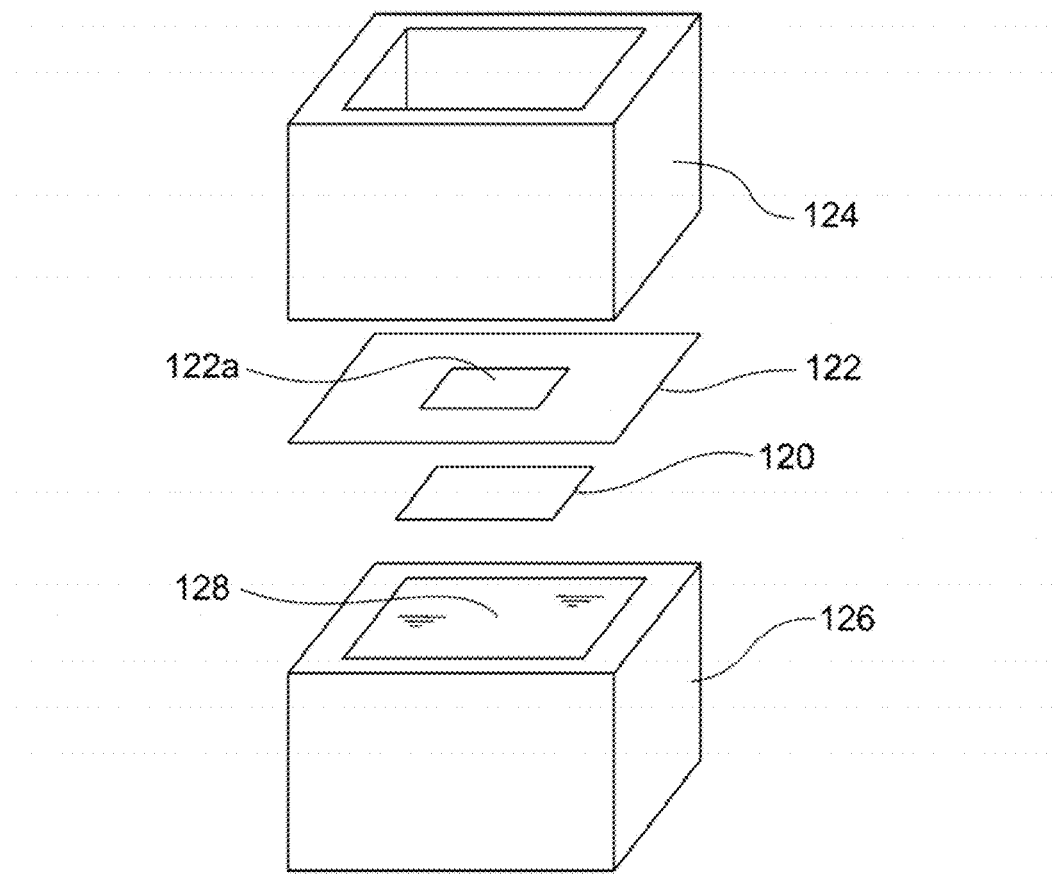
FIG. 2A is an exploded perspective view of a system used in density evaluation test I in Examples 1 to 3.
Figure 2B:
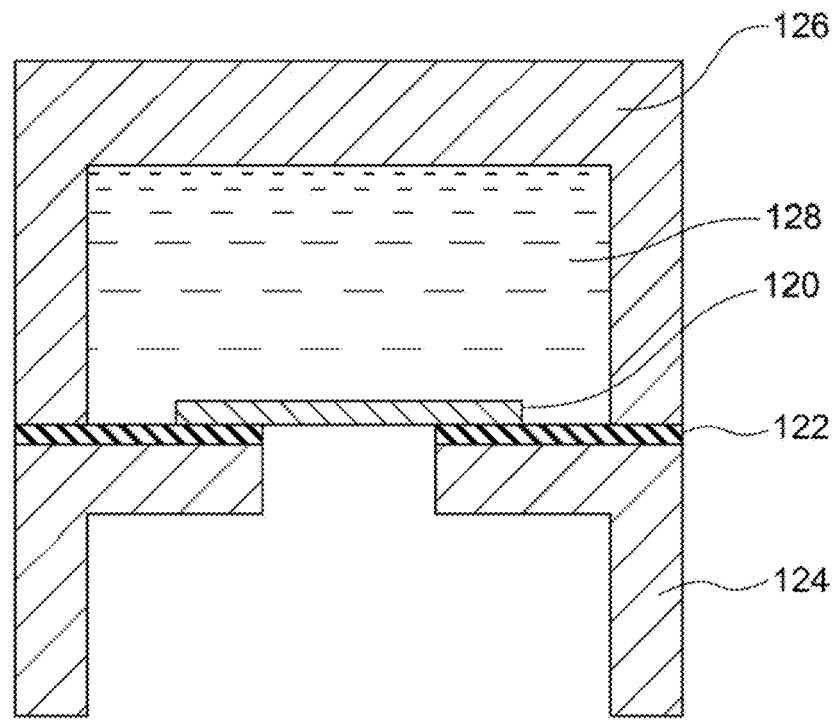
FIG. 2B is a schematic cross-sectional view of a system used in density evaluation test I in Examples 1 to 3.

A density evaluation test was performed on the membrane sample for determining whether the sample has high density and thus water impermeability. With reference to FIG. 2A, a silicone rubber 122 having a central opening 122a (0.5 cm×0.5 cm) was bonded to the membrane sample of LDH-containing composite material sample 120 (cut into a piece of 1 cm×1 cm), and the resultant laminate was disposed between two acrylic units 124 and 126 and bonded to these acrylic units. The acrylic unit 124 disposed on the silicone rubber 122 has no bottom, and thus the silicone rubber 122 is bonded to the acrylic unit 124 such that the opening 122a is exposed. The acrylic unit 126 disposed on the porous substrate side in view of composite material sample 120 has a bottom and contains ion-exchange water 128. In this case, Al and/or Mg may be dissolved in the ion-exchange water. Thus, these components are arranged to form an assembly such that the ion-exchange water 128 comes into contact with the porous substrate of composite material sample 120 if the assembly is inverted upside down. It goes without saying that the unit 126 has a closed vent (not shown) and the vent is opened after inversion of the assembly. As illustrated in FIG. 2B, the assembly was inverted and left for one week at 25° C., and then the total weight thereof was measured again. Before measurement of the weight of the assembly, water droplets on the inner side(s) of the acrylic unit 124 were wiped off, if any. The density of the membrane sample was evaluated on the basis of the difference between the total weights of the assembly before and after the inversion. When no change in weight of the ion-exchange water is observed even after the one-week test at 25° C., the membrane sample (i.e., functional membrane) was evaluated as having high density so as to exhibit water impermeability.

Evaluation 4: Density Evaluation Test II

Figure 3A:
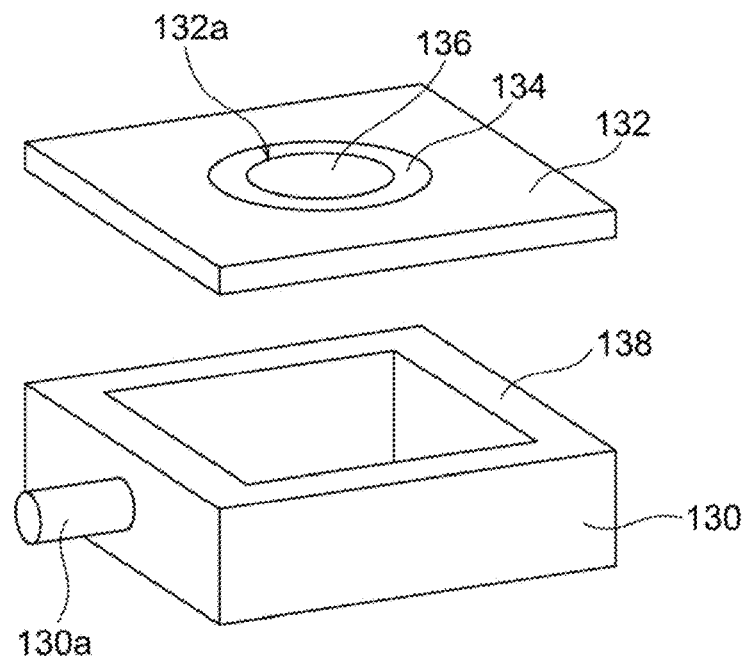
FIG. 3A is an exploded perspective view of a hermetic container used in density evaluation test II in Examples 1 to 3.
Figure 3B:
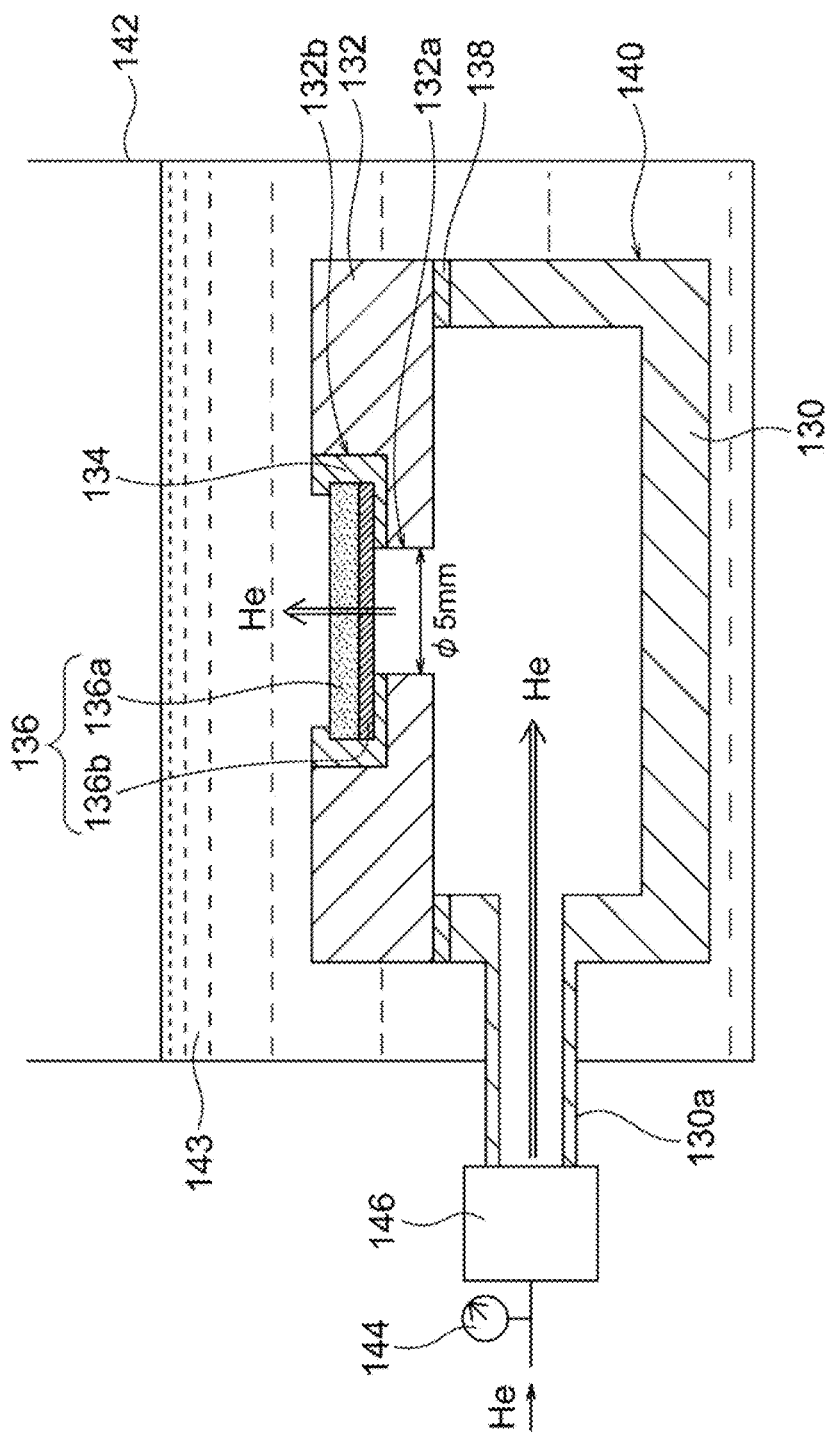
FIG. 3B is a schematic cross-sectional view of a system used in density evaluation test II in Examples 1 to 3.

A density evaluation test was performed on the membrane sample for determining whether the sample has high density and thus gas impermeability. As illustrated in FIGS. 3A and 3B, an acrylic container 130 and an alumina jig 132 were provided. The container 130 has no lid, and the jig 132 has a shape and a size such that it serves as a lid for the container 130. The acrylic container 130 has a gas inlet 130a for feeding a gas into the container 130. The alumina jig 132 has an opening 132a having a diameter of 5 mm, and a dent 132b provided around the opening 132a for supporting the membrane sample. An epoxy adhesive 134 was applied to the dent 132b of the alumina jig 132, and a membrane sample 136b of a composite material sample 136 was placed on the dent 132b and gas- and liquid-tightly bonded to the alumina jig 132. The alumina jig 132 provided with the composite material sample 136 was gas- and liquid-tightly bonded to the upper edge of the acrylic container 130 with a silicone adhesive 138 so as to completely cover the opening of the acrylic container 130, to prepare a hermetic container 140 for evaluation. The hermetic container 140 was placed in a water bath 142, and the gas inlet 130a of the acrylic container 130 was connected to a pressure gauge 144 and a flowmeter 146 so as to allow helium gas to be fed into the acrylic container 130. Water 143 was poured into the water bath 142 such that the hermetic container 140 was completely submerged in the water. The hermetic container 140 was ensured to have gas tightness and liquid tightness. The membrane sample 136b of the composite material sample 136 was exposed to the inner space of the hermetic container 140, and the porous substrate 136a of the composite material sample 136 was in contact with the water in the water bath 142. Helium gas was fed into the hermetic container 140 through the gas inlet 130a of the acrylic container 130. The pressure gauge 144 and the flowmeter 146 were monitored to achieve a differential pressure of 0.5 atm at the membrane sample 136b (i.e., the pressure applied to the surface in contact with helium gas was higher by 0.5 atm than water pressure applied to the opposite surface), to determine the presence of helium gas bubbles in the water caused by permeation of helium gas through the composite material sample 136. When no helium gas bubbles were observed, the membrane sample 136b was evaluated as having high density so as to exhibit gas impermeability.

Example 1

(1) Preparation of Porous Substrate

Zirconia (8YSZ) powder (TZ-8YS, $Y_2O_3$: 8 mol %, manufactured by Tosoh Corporation), methyl cellulose, and ion-exchange water were weighed in proportions by mass of 10:1:5, and were then kneaded together. The kneaded product was subjected to extrusion molding with a hand press into a size of 2.5 cm×10 cm×0.5 cm in thickness. The resultant green body was dried at 80° C. for 12 hours and then fired at 1,100° C. for three hours. The resultant product was processed into a zirconia porous substrate having dimensions of 2 cm by 2 cm by 0.3 cm.

The porosity at the surface of the resultant porous substrate was determined by a method involving image processing. The porosity was 50%. The porosity was determined as follows: 1) a scanning electron microscopic (SEM) image of the surface microstructure of the porous substrate was taken with a scanning electron microscope (SEM; JSM-6610LV, manufactured by JEOL Ltd.) (magnification: 10,000 or more) at an acceleration voltage of 10 to 20 kV; 2) the grayscale SEM image was read with image analysis software, such as Photoshop (manufactured by Adobe); 3) a monochromatic binary image was prepared with tools named [image], [color compensation], and [binarization] in this order; and 4) the porosity (%) was determined by dividing the number of pixels of the black areas by the number of all the pixels of the image. The porosity was determined over a 6 μm×6 μm area of the surface of the porous substrate.

The average pore size of the porous substrate was about 0.2 μm. In the present invention, the average pore size was determined by measuring the largest length of each pore in a scanning electron microscopic (SEM) image of the surface of the porous substrate. The magnification of the scanning electron microscopic (SEM) image used in this measurement was 20,000. All the measured pore sizes were listed in order of size to calculate the average, from which the subsequent 15 larger sizes and the subsequent 15 smaller sizes, i.e., 30 sizes in total, were selected in one field of view. The selected sizes of two fields of view were then averaged to yield the average pore size. The pore sizes were measured by, for example, a length-measuring function of SEM software.

The resultant porous substrate was ultrasonically cleaned in acetone for five minutes, in ethanol for two minutes, and then in ion-exchange water for one minute.

(2) Preparation of Aqueous Stock Solution

Magnesium nitrate hexahydrate ($Mg(NO_3)_2 \cdot 6H_2O$, manufactured by KANTO CHEMICAL Co., Inc.), aluminum nitrate nonahydrate ($Al(NO_3)_3 \cdot 9H_2O$, manufactured by KANTO CHEMICAL Co., Inc.), and urea (($NH_2)_2CO$, manufactured by Sigma-Aldrich Corporation) were provided as raw materials for an aqueous stock solution. Magnesium nitrate hexahydrate and aluminum nitrate nonahydrate were weighed and placed in a beaker, and then ion-exchange water was added to the beaker to achieve a total volume of 75 mL, a ratio of the cations ($Mg^{2+}/Al^{3+}$) of 2, and a molar concentration of the total metal ions (i.e., $Mg^{2+}$ and $Al^{3+}$) of 0.24 mol/L. The resultant solution was agitated and urea was then added to the solution. The added urea was weighed in advance to give a urea/$NO_3^-$ ratio of 4.5. The resultant solution was further agitated to prepare an aqueous stock solution.

(3) Formation of Membrane by Hydrothermal Treatment

The aqueous stock solution prepared in the above procedure (2) and the porous substrate cleaned in the above procedure (1) were enclosed together in a hermetic Teflon (registered trademark) container (with an internal volume of 100 mL and a stainless steel jacket). The porous substrate was horizontally suspended and away from the bottom of the hermetic Teflon (registered trademark) container such that the opposite surfaces of the porous substrate came into contact with the aqueous stock solution. Thereafter, the porous substrate was subjected to hydrothermal treatment at a hydrothermal temperature of 70° C. for 10 days to form oriented layered double hydroxide membranes (functional layers) on the surfaces of the substrate. After the elapse of a predetermined period of time, the porous substrate was removed from the hermetic container, cleaned with ion-exchange water, and then dried at 70° C. for 10 hours, to form a dense membrane of the layered double hydroxide (LDH) on the porous substrate (hereinafter the dense membrane will be referred to as "membrane sample"). The thickness of the membrane sample was about 1.5 μm. A layered-double-hydroxide-containing composite material sample was thereby prepared. LDH membranes were formed on the opposite surfaces of the porous substrate. In order to use the composite material as a separator, the LDH membrane on one surface of the porous substrate was mechanically removed.

(4) Results of Evaluations

The resultant LDH membrane sample was evaluated. The results of evaluations 1 to 4 are described below.

Evaluation 1: The membrane sample was identified as an LDH (hydrotalcite compound) on the basis of the XRD profile.

Figure 4A:
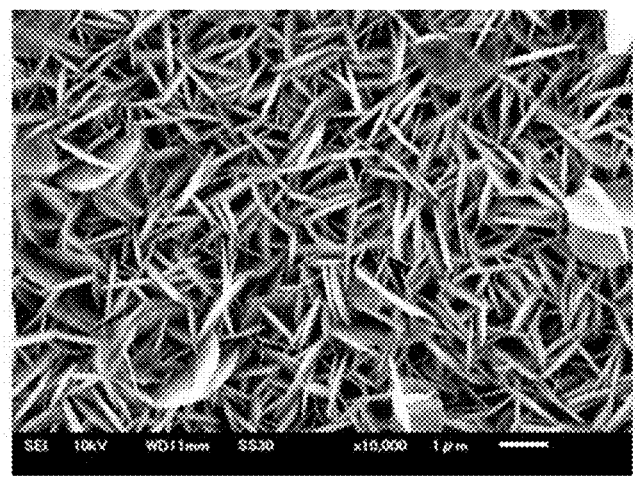
FIG. 4A is a SEM image of a surface microstructure of a LDH membrane sample in Example 1.
Figure 4B:
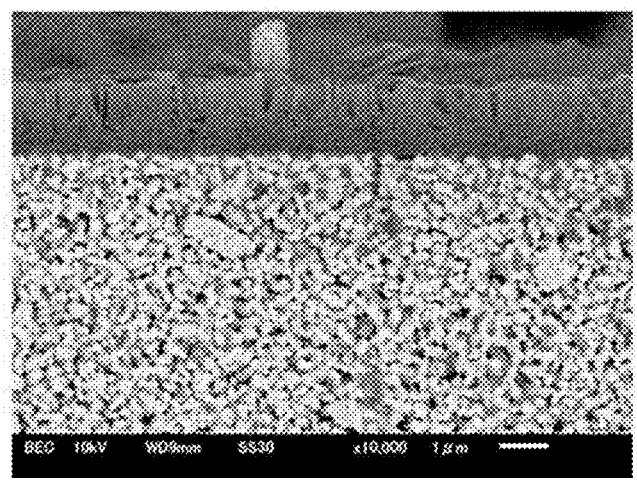
FIG. 4B is a SEM image of a microstructure at a cross-sectional surface of a LDH membrane sample in Example 1.

Evaluation 2: FIGS. 4A and 4B are SEM images of the surface microstructure and cross-sectional microstructure of the membrane sample, respectively. As illustrated in FIGS. 4A and 4B, a dense membrane (i.e., a dense layer) was present in the vicinity of the interface between the LDH membrane and the substrate, and a large number of voids were present between particles at the surface of the membrane sample. Thus, the surface of the membrane sample has a non-flat structure rich in voids and protrusions and thus has a large surface area. Accordingly, the use of the membrane sample as a separator in an electrolytic solution leads to an increase in interfacial area between the membrane sample and the electrolytic solution, resulting in reduced interfacial resistance.

Evaluation 3: The membrane sample was determined to have sufficiently high density to exhibit water impermeability.

Evaluation 4: The membrane sample was determined to have sufficiently high density to exhibit gas impermeability.

Example 2

An LDH membrane sample was prepared as in Example 1 except that the molar concentration of the total metal ions (i.e., $Mg^{2+}$ and $Al^{3+}$) was varied to 0.35 mol/L and urea was added to the solution to achieve a urea/$NO_3^-$ ratio of 5.5 in the aforementioned procedure (2) (preparation of aqueous stock solution), and the hydrothermal treatment was performed at 70° C. for 12 days in the aforementioned procedure (3) (formation of membrane by hydrothermal treatment).

The resultant LDH membrane sample was evaluated. The results of evaluations 1 to 4 are described below.

Evaluation 1: The membrane sample was identified as an LDH (hydrotalcite compound) on the basis of the XRD profile.

Evaluation 2: FIGS. 5A and 5B are SEM images of the surface microstructure and cross-sectional microstructure of the membrane sample, respectively. As illustrated in FIGS. 5A and 5B, a dense membrane (i.e., a dense layer) was present in the vicinity of the interface between the LDH membrane and the substrate, and voids were present between particles at the surface of the membrane sample. In addition, the membrane sample had acicular particles A protruding from the dense layer in a direction substantially perpendicular to the dense layer, and open-porous coarse particles B (spherical moss-like particles); i.e., agglomerates of acicular or platy particles entangling each other for form voids. Thus, the surface of the membrane sample has a non-flat structure rich in voids and protrusions and thus has a large surface area. Accordingly, the use of the membrane sample as a separator in an electrolytic solution leads to an increase in interfacial area between the membrane sample and the electrolytic solution, resulting in reduced interfacial resistance.

Evaluation 3: The membrane sample was determined to have sufficiently high density to exhibit water impermeability.

Evaluation 4: The membrane sample was determined to have sufficiently high density to exhibit gas impermeability.

Example 3 (Comparative)

An LDH membrane sample was prepared as in Example 1 except that the molar concentration of the total metal ions (i.e., $Mg^{2+}$ and $Al^{3+}$) was varied to 0.28 mol/L and urea was added to the solution to achieve a urea/$NO_3^-$ ratio of 3.5 in the aforementioned procedure (2) (preparation of aqueous stock solution), and the hydrothermal treatment was performed at 70° C. for five days in the aforementioned procedure (3) (formation of membrane by hydrothermal treatment).

The resultant LDH membrane sample was evaluated. The results of evaluations 1 to 4 are described below.

Evaluation 1: The membrane sample was identified as an LDH (hydrotalcite compound) on the basis of the XRD profile.

Figure 6A:
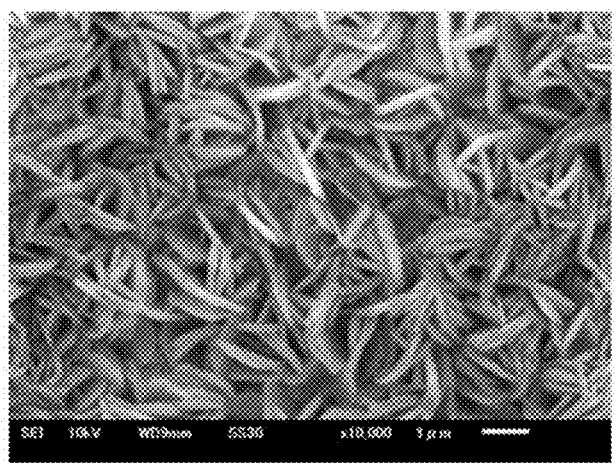
FIG. 6A is a SEM image of a surface microstructure of a LDH membrane sample in Example 3.
Figure 6B:
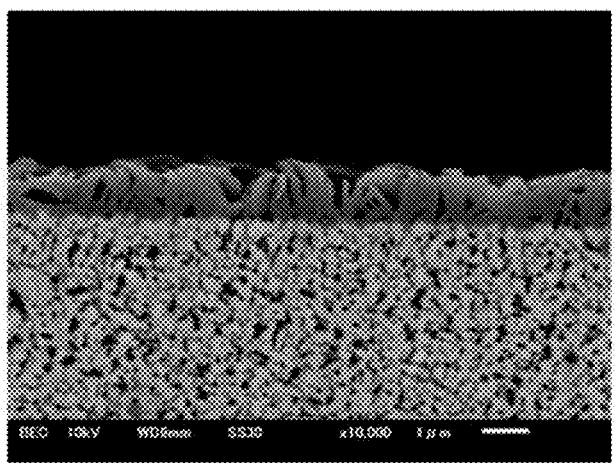
FIG. 6B is a SEM image of a microstructure at a cross-sectional surface of a LDH membrane sample in Example 3.

Evaluation 2: FIGS. 6A and 6B are SEM images of the surface microstructure and cross-sectional microstructure of the membrane sample, respectively. As illustrated in FIGS. 6A and 6B, the membrane sample had numerous voids between constitutive particles, and a dense portion was absent even in the vicinity of the substrate; i.e., no dense layer was determined.

Evaluation 3: The membrane sample was determined to have water permeability; i.e., low density.

Evaluation 4: The membrane sample was determined to have gas permeability; i.e., low density.

What is claimed is:

1. A layered double hydroxide membrane comprising a layered double hydroxide represented by the formula: $M^{2+}_{1-x}M^{3+}_x(OH)_2A^{n-}_{x/n}\cdot mH_2O$ (where $M^{2+}$ represents a divalent cation, $M^{3+}$ represents a trivalent cation, $A^{n-}$ represents an n-valent anion, n is an integer of 1 or more, x is 0.1 to 0.4, and m is 0 or more), the layered double hydroxide membrane having water impermeability, wherein
the layered double hydroxide membrane comprises a dense layer having water impermeability, and a non-flat surface structure that is rich in voids and/or protrusions and disposed on at least one side of the dense layer.

2. The layered double hydroxide membrane according to claim 1, wherein the non-flat surface structure comprises acicular particles protruding from the dense layer in a direction away from the dense layer.

3. The layered double hydroxide membrane according to claim 2, wherein the acicular particles each have a cross-sectional diameter of 0.01 to 0.5 μm and a height of 0.5 to 3.0 μm.

4. The layered double hydroxide membrane according to claim 1, wherein the non-flat surface structure comprises open-porous coarse particles that are rich in voids.

5. The layered double hydroxide membrane according to claim 4, wherein the open-porous coarse particles comprise agglomerates of acicular or platy particles, the acicular or platy particles entangling each other to form voids.

6. The layered double hydroxide membrane according to claim 4, wherein the open-porous coarse particles each have a diameter of 0.5 to 30 μm as measured in a direction parallel to the dense layer and a height of 0.5 to 30 μm.

7. The layered double hydroxide membrane according to claim 1, wherein the layered double hydroxide contained in the dense layer is an agglomeration of platy particles, and the platy particles are oriented in such a manner that the tabular faces of the platy particles are substantially perpendicular to or oblique to the surface of the dense layer.

8. The layered double hydroxide membrane according to claim 1, wherein in the general formula, $M^{2+}$ comprises $Mg^{2+}$, $M^{3+}$ comprises $Al^{3+}$, and $A^{n-}$ comprises $OH^-$ and/or $CO_3^{2-}$.

9. The layered double hydroxide membrane according to claim 1, having a thickness of not more than 100 μm.

10. A layered-double-hydroxide-containing composite material comprising a porous substrate and the layered double hydroxide membrane according to claim 1, the layered double hydroxide membrane being disposed on at least one surface of the porous substrate.

11. The layered-double-hydroxide-containing composite material according to claim 10, wherein the porous substrate is composed of at least one selected from the group consisting of ceramics, metals and polymers.

12. The layered-double-hydroxide-containing composite material according to claim 11, wherein the porous substrate is composed of a ceramic, and the ceramic is at least one selected from the group consisting of alumina, zirconia, titania, magnesia, spinel, calcia, cordierite, zeolite, mullite, ferrite, zinc oxide, and silicon carbide.

13. The layered-double-hydroxide-containing composite material according to claim 10, wherein the porous substrate has an average pore diameter of 0.001 to 1.5 μm.

14. The layered-double-hydroxide-containing composite material according to claim 10, wherein the surface of the porous substrate has a porosity of 10 to 60%.

15. A battery comprising a separator comprising the layered double hydroxide membrane according to claim 1.

16. A battery comprising a separator comprising the layered-double-hydroxide-containing composite material according to claim 10.

* * * * *